United States Patent [19]

Jeschke

[11] 4,407,197

[45] Oct. 4, 1983

[54] DEVICE AND METHOD OF MONITORING DAMPENING AND INKING EQUILIBRIUM IN OFFSET PRINTING UNITS

[75] Inventor: Willi Jeschke, Heidelberg, Fed. Rep. of Germany

[73] Assignee: Heidelberger Druckmaschinen AG, Heidelberg, Fed. Rep. of Germany

[21] Appl. No.: 368,647

[22] Filed: Apr. 15, 1982

Related U.S. Application Data

[60] Division of Ser. No. 206,625, Nov. 13, 1980, abandoned, which is a continuation of Ser. No. 933,617, Aug. 14, 1978, abandoned.

[30] Foreign Application Priority Data

Aug. 13, 1977 [DE] Fed. Rep. of Germany ....... 2736663

[51] Int. Cl.³ .................. B41F 7/26; B41F 31/10; B41F 33/00
[52] U.S. Cl. .................................. 101/148; 101/349
[58] Field of Search ............ 101/147, 148, 349, 350, 101/365, 363, 206, 207, 208, 210; 250/573, 575, 576, 574, 564, 565; 356/434, 435, 436

[56] References Cited

U.S. PATENT DOCUMENTS

| 3,353,484 | 11/1967 | Koyak | 101/350 |
| 3,707,123 | 12/1972 | Heasman et al. | 101/365 X |
| 3,805,700 | 4/1974 | Chambon | 101/148 |
| 3,960,451 | 6/1976 | Wirz et al. | 101/350 X |
| 4,151,796 | 5/1979 | Uhrig | 101/350 X |

FOREIGN PATENT DOCUMENTS

| 2300922 | 7/1974 | Fed. Rep. of Germany | 101/350 |
| 2412234 | 1/1977 | Fed. Rep. of Germany | 101/349 |
| 1150709 | 4/1969 | United Kingdom | 101/350 |

Primary Examiner—J. Reed Fisher
Attorney, Agent, or Firm—Herbert L. Lerner; Laurence A. Greenberg

[57] ABSTRACT

Device for testing dampening liquid and ink equilibrium in offset printing units having a plurality of dampening liquid applicator rollers defining a dampening film flow path and a plurality of ink applicator rollers defining an ink film flow path, includes a solitary test roller disposable in at least one of the flow paths and having an outer casing surface of hydrophilic construction at least over a partial region thereof, and means for effecting contact between the solitary test roller and at least one roller of the respective pluralities of dampening liquid and ink applicator rollers so as to form a corresponding film thereon.

6 Claims, 8 Drawing Figures

DEVICE AND METHOD OF MONITORING DAMPENING AND INKING EQUILIBRIUM IN OFFSET PRINTING UNITS

This is a division of application Ser. No. 206,625, filed Nov. 13, 1980 now abandoned, which is a continuation of Ser. No. 933,617, filed Aug. 14, 1978, now abandoned.

The invention relates to a device for monitoring the dampening and inking equilibrium in offset printing units having a test roller located in the dampening liquid and/or ink flow path, the thickness of the liquid film formed on the test roller being measured.

The correct quantitative ratio of dampening liquid and ink on the offset printing plate has a considerable influence upon the quality of printing which can be achieved with offset printing units. Much skill and time outlay is required by the printer in order to establish and maintain this optimal ratio of dampening liquid feed and inking. In this regard, the printer has available to him, in modern offset printing units, devices for testing the individual components i.e. ink and dampening liquid.

For example, it has become known heretofore from German Published Prosecuted Application DE-AS No. 2 412 234 to test the dampening film thickness on the offset plate by a reflection test method directly in front or upstream of the first inking applicator roller. The test is performed by irradiating the wetted printing plate with infra-red light. However, a reflection of the infra-red light which is produced is not solely a function of the dampening film thickness, but is also greatly influenced by the structure of the plate surface and by the type of plate. The results obtained can therefore differ from one another considerably for different offset plates and may thus result in a misinterpretation of the test values. The shine of many offset plates, for example, renders a dampening film test of this type virtually impossible.

In order to circumvent this difficulty, it has been proposed heretofore to provide, in the channel of the plate cylinder, a reference surface which is likewise wetted by the dampening applicator rollers. Then, by reflection testing or measurement, variations of the dampening film could be detected at this point which are representative of the dampening film on the offset plate. In addition to the disadvantage, however, that this heretofore proposed reference surface can interfere with the operation of the inking rollers, this known method is only possible for use with sheet-fed offset printing presses in which a sufficiently wide channel is available. Testing by means of a reference surface in a channel cannot be used for rotary offset printing machines which, as is generally known, have no channel.

Tests or measurements of the dampening film directly on the plate cylinder have a disadvantage primarily in that it is not solely the dampening film which is being tested or measured. The reciprocal interaction of ink and water or dampening liquid is not detected sufficiently. The inking rollers do indeed roll over the plate cylinder and accordingly also affect the dampening film thickness on the nonprinting regions when the dampening film is tested, for example, after the inking, but nevertheless no information as to the extent of water absorption in the inking unit is obtained. The dampening liquid and ink equilibrium is therefore only inadequately evaluated.

It is accordingly an object of the invention to provide method and device for monitoring or testing the ink film and the dampening liquid film and the mutual or reciprocal behavior thereof in order to determine the equilibrium at a point where prejudicial influences of the offset printing plate due to the results thereof upon the testing or monitoring device are eliminated.

In a narrower sense, it is an object of the invention to provide such a method and device that is highly economical and reliable and which, for a minimum outlay, and without hindrance from the offset plate, evaluates both the ink film and the dampening liquid film without any detectable interference with the inking process.

With the foregoing and other objects in view, there is provided, in accordance with the invention, a device for testing dampening liquid and ink equilibrium in offset printing units having a plurality of dampening liquid applicator rollers defining a dampening film flow path and a plurality of ink applicator rollers defining an ink film flow path, comprising a solitary test roller disposable in at least one of the flow paths and having an outer casing surface of hydrophilic construction at least over a partial region thereof, and means for effecting contact between the solitary test roller and at least one roller of the respective pluralities of dampening liquid and ink applicator rollers so as to form a corresponding films thereon.

The invention thus makes use of the discovery that, essentially, the wettability of a surface by the dampening liquid determines the measure of displacement of ink and, consequently, a single or solitary test roller can be used both for determining the ink feed and also for testing the dampening liquid feed.

In accordance with another feature of the invention, the test roller is in contact simultaneously with one roller of the plurality of ink applicator rollers and one roller of the plurality of dampening liquid applicator rollers, and the outer casing surface of the test roller is formed at least partly of glass. Basically, any material which is wettable by ink and by dampening liquid can be used for the test roller. If the material is not transparent, then testing or measuring is performed by the reflection method. A material translucent in the visible and infra-red range, such as glass, has the advantage, however, that the layer thicknesses can be tested by the transmitted light method.

It has in fact, already become known heretofore from the British Pat. No. 1,226,487 to use a transparent roller for determining the ink film thickness by the transmitted light method, however, no teaching is provided therein as to the testing or measuring of the dampening liquid film.

In accordance with an alternate feature of the invention, the test roller is pivotally mounted and is contactable alternately with the one ink applicator roller and the one dampening liquid applicator roller, and the outer casing surface of the test roller is formed with a region-extending in axial direction of the test roller and being non-wettable by the dampening liquid and the ink, the region being, for example, a notch or a field of low transparency.

In accordance with a further feature of the invention, the offset printing unit has a plate cylinder rotatable in given direction, the pluralities of dampening liquid and ink applicator rollers being engageable with the plate cylinder, the test roller being contactable with the last of the dampening liquid applicator rollers and the first of the ink applicator rollers as viewed in rotary direction of the plate cylinder.

In accordance with an added feature of the invention, the non-wettable region is a channel formed in the outer casing surface.

With this test apparatus the wetting cycle of the test roller is utilized for testing. In fact, for a specific ink and the dampening liquid associated therewith, a definite relationship can be established between the thickness of the ink and dampening liquid layer, on the one hand, and the number rotations or revolutions of the test roller, on the other hand, until complete and no longer increasing wetting exists. After a change of the test roller from being in contact with the ink-carrying applicator roller of the inking unit to being in contact with the dampening liquid-carrying applicator roller of the dampening unit, in the case of a small supply of dampening liquid, a relatively long time period will elapse before the outer casing surface of the test roller is free of ink again. In contrast thereto, when a generous supply of dampening medium is provided, the ink will be transported very rapidly away from the test roller surface until, in the further course of contact, the test roller surface is finally wetted completely with a layer of dampening medium having a thickness which no longer increases.

By counting the number of revolutions or rotations of the test roller from the commencement of the change of contact until the constant wetting with dampening liquid, or if the time constant of the transition behavior is determined, then a measure of the layer thicknesses is provided. Such a device renders superfluous the testing or measurement of the dampening liquid and ink layer thicknesses in absolute values on the surface of the test roller. It is sufficient if, adopting the hereinabove-described procedure, one determines in transmitted or reflected light how quickly the film changes to a dampening liquid film. The duration of the reverse process, from the commencement of contact by the test roller wetted with dampening liquid to constant inking or the inking occurring within a time unit, is also a measurement of the dampening liquid and ink equilibrium.

In accordance with an additional feature of the invention, the outer casing surface of the test roller is formed with both hydrophilic and oleophilic regions thereon.

In accordance with yet another feature of the invention, regions each forming substantially half of the outer casing surface of test roller, as viewed in peripheral direction thereof, are successively formed of hydrophylic and oleophilic material.

In accordance with yet a further feature of the invention, channels are formed in the outer casing surface of the test roller for separating the hydrophilic and the oleophilic regions thereof from one another.

The test roller is simultaneously in contact with both an ink-carrying roller and a dampening liquid-carrying roller, while the hydrophilic surface portions accept the dampening liquid and the oleophilic surface portions accept the ink. The dampening liquid film thickness is then tested or measured by means of reflected beams with the aid of infra-red detectors on the hydrophilic outer casing surface region and the ink film thickness with the aid of a photo-transistor on the oleophilic outer casing surface region. The hydrophilic surface region may be formed, for example, of chromium, and the oleophilic surface retion, for example, of copper.

In accordance with more specific features of the invention, the test roller is in contact simultaneously with one of the ink applicator rollers and one of the dampening liquid applicator rollers, and the outer casing surface of the test roller is formed at least partly of glass, and including a radiation source disposed within the glass test roller, a pair of infra-red detectors and a photo-transistor disposed adjacent the glass test roller and irradiatable by radiation from the radiation source penetrating the glass surface and the dampening liquid and ink film formed thereon, the infra-red detectors having means for evaluating thickness of the dampening liquid film, and the photo-transistor having means for evaluating an ink layer fraction in the dampening liquid and ink film on the outer casing surface of the test roller.

In accordance with one mode of the method of testing dampening liquid and ink equilibrium in accordance with the invention, two infra-red detectors and a photo-transistor are irradiated with radiation from a radiation source disposed in a glass test roller simultaneously in contact with an ink applicator roller and a dampening liquid applicator roller so that the radiation penetrates the glass test roller and a dampening liquid and ink film formed thereon before it reaches the infra-red detectors and the photo-transistor and, with the infra-red detectors, the thickness of dampening liquid film is evaluated, and with the photo-transistor, the ink layer fraction in the dampening liquid and ink film is evaluated.

In accordance with another mode of the inventive method, wherein a test roller is pivotally mounted and is contacted alternately with one ink applicator roller and one dampening liquid applicator roller, and the outer casing surface of the test roller is formed with a region non-wettable by the dampening liquid and the ink and extending in axial direction of the test roller, the method comprises irradiating two infra-red detectors with radiation from a radiation source disposed in a glass test roller alternatingly in contact with an ink applicator roller and a dampening liquid applicator roller so that the radiation penetrates the glass test roller and a film formed thereon before the radiation reaches the infra-red detectors, recording test signals from the infra-red detectors in the form of a plotted curve indicating selectively removal of the ink by the dampening liquid and removal of the dampening liquid by the ink on the outer casing surface of the test roller, the non-wettable region formed on the outer casing surface interrupting the plotted curve with each rotation of the test roller so that the number of interruption before complete removal of the ink and the dampening liquid, respectively, is a measure of the thickness of the respective film thereof on the respective applicator roller.

In accordance with a further mode, the method according to the invention comprises indicating the number of rotations of the test roller from the instant at which it changes over from being in contact with the one roller of the respective dampening liquid and inking applicator rollers to the other roller of the respective dampening liquid and inking applicator rollers to the instant at which a transition point occurs.

In accordance with an added mode, the method according to the invention comprises indicating the differential quotient of the test signal issued in the respective alternating contact condition of the test roller and the dampening liquid and ink applicator rollers from dampening liquid to ink and from ink to dampening liquid.

In accordance with a concomitant mode, the method according to the invention comprises disposing a test roller in contact simultaneously with one roller of a plurality of ink applicator rollers and one roller of a plurality of dampening liquid applicator rollers, and irradiating two infra-red detectors and a photo-transistor disposed adjacent the test roller with radiation reflected from respective hydrophilic and oleophilic outer casing surface regions of the test roller and emanating from a radiation source outside the test roller, and evaluating with the infra-red detectors the thickness of the dampening liquid film on the hydrophilic surface region and with the photo-transistor the thickness of the ink film on the oleophilic surface region.

Other features which are considered as characteristic for the invention are set forth in the appended claims.

Although the invention is illustrated and described herein as embodied in a device and method of monitoring dampening and inking equilibrium in offset printing units, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
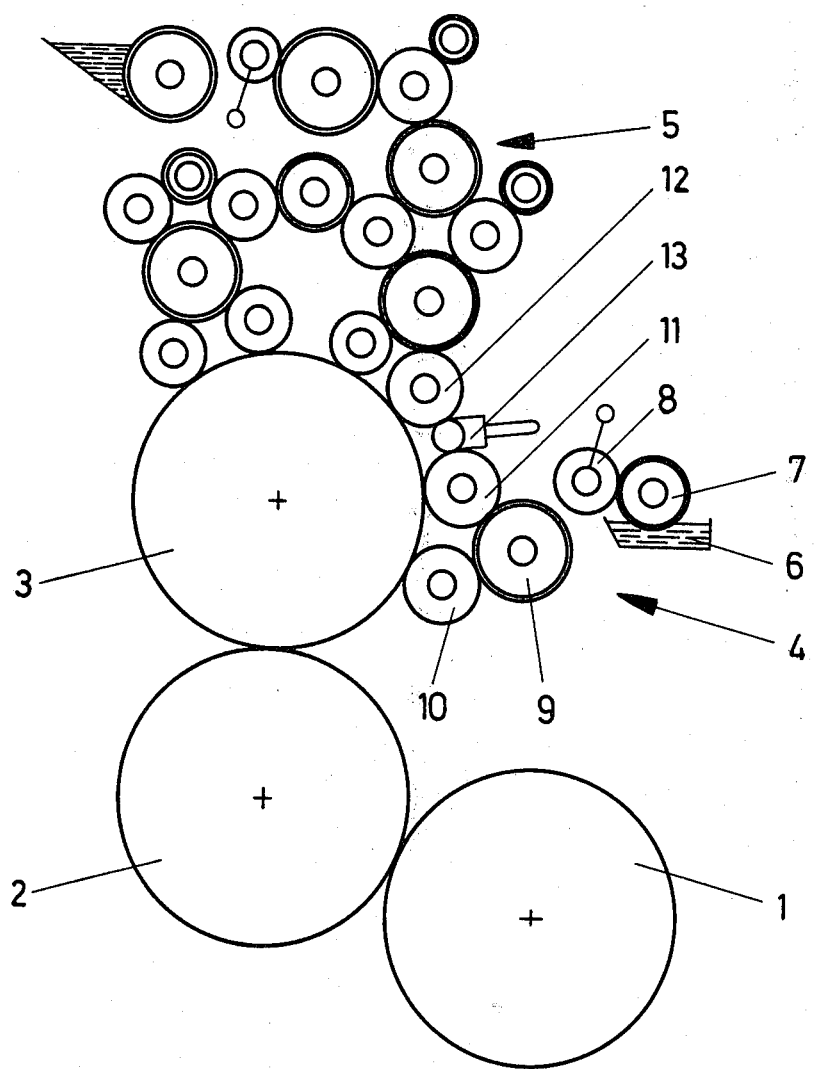
FIG. 1 is a diagrammatic view of an offset printing unit with a transmitted light test meter according to the invention.

Referring now to the drawing and first, particularly to FIG. 1 thereof, there is shown an offset printing unit with an impression cylinder 1, as a blanket cylinder 2, a plate cylinder 3, a dampening unit 4 and an inking unit 5. The dampening unit 4 includes a dampening-liquid tank 6, a dampening ductor 7, immersed in the tank 6, as dampening lifter roller 8, a dampening distributor 9 which received dampening liquid transferred by the roller 8 from the ductor 7, and a first dampening applicator roller 10 and a second dampening applicator roller 11 which apply dampening liquid received from the distributor 9 to the plate cylinder 3.

A test head 13 is disposed between the second dampening applicator roller 11 and a first ink applicator roller 12 of the inking unit 5. As shown in greater detail in FIG. 2, the test head 13 includes a test roller 14, which has an axis of rotation that extends parallel to respective axes of rotation 15 of the two dampening applicator rollers 11 and 10 as well as the ink applicator rollers 12. The test head 13 is shiftably disposed as that the contact pressure of the test roller 14 against the dampening applicator roller 14 is formed of glass or similar transparent material. An internal radiation source 16 is located therein.

An infra-red detector 18 for a test beam and, thereabove, another infra-red detector 19 for a reference beam are provided in the housing 17 of the test head 13. Filters 20 and 24 are disposed, respectively, i.e. upstream of each of the two infra-red detectors 18 and 19, as viewed in radial direction from the radiation source 16 in FIG. 2. A conventional photo-transistor 21 for ink evaluation is located between the two infra-red detectors 18 and 19. The infra-red detectors 18 and 19 are exposed to the rays of the radiation source 16 through the glass roller 14 and through the filters 20 and 24, respectively, and the photo-transistor without any interposition of a filter. An upper mask 22 and a lower mask 23, as viewed in FIG. 2, extend concentrically or coaxially to the glass test roller 14 at a given spacing therefrom and thus shield the detectors against stray light. The two masks 22 and 23 are fixed to the housing 14 of the test head 13.

The infra-red detectors are connected electrically, in a conventional manner, through impedance transducers 26 and computing amplifiers 27 to an indicating device 28 for indicating the dampening film thickness. The test signal of the photo-transistor 21 is amplified by an amplifier 29 and transmitted to another indicating device 30 for the ink.

The hereinaforedescribed test apparatus operates as follows:

As the glass test roller 14 (FIG. 2) rolls against the elastic cover or lining of the second dampening applicator roller 11, a liquid film is removed during normal dampening, whereas the ink layer present on the outer casing surface of the dampening applicator roller 11 and the ink applicator roller 12 is not removed. The radiation source 16 disposed in the center of the test roller 14 emits a bundle of infra-red rays which passes through the transparent wall of the test roller 14 and the dampening film, and through the two filters 20 and 24, respectively, and impinges on the infra-red detectors 18 and 19. In accordance with the thickness of the dampening film, infra-red rays, a wavelength of $\lambda = 2.93$ μm, for example, are absorbed for the most part and can thus be used to determine the dampening film thickness.

The narrow-band interference filter 20 in front of the infra-red detector 18 permits only a specific test beam from the radiation spectrum of the radiation source 16 to pass therethrough. With increasing thickness of the dampening film, the intensity of radiation acting upon the infra-red detectors 18 and 19 becomes smaller and a variation in resistance is obtained. Because the resistance of the infra-red detector 18, 19 varies also with the ambient temperature and, moreover, the intensity of the radiation source 16 does not remain constant, a reference potential must be provided for the measurements. For this purpose, a reference beam having a wavelength which is only weakly absorbed by water is provided. This reference beam passes through the filter 24 and impinges upon the infra-red detector 19. The two beams or rays i.e. the test beam or ray and the reference beam or ray, are close together in wavelengths thereof in order for them to undergo equal variations due to disturbances of the hereinaforementioned type; therefore in the comparison only variations in the layer thickness effectively modify the test signal.

The infra-red detectors 18 and 19, which are supplied with constant voltage, deliver signals that are fed through the impedance transducer 16 in amplified form to a comparative computing amplifier 27. The output voltage of the computing amplifier 27 is proportional to the dampening film thickness on the test roller 14 and is indicated to the printer in the indicating instrument 28.

In the case of insufficient dampening, the offset plate, as is generally known, becomes clogged with ink. This decidedly disturbs the dampening-liquid/ink equilibrium.

In this case, ink is transferred to the test roller 14 both over the inking applicator roller 12 as well as the dampening applicator roller 11, due to which the intensity of the test signal is reduced. The photo-transistor 21 disposed additionally in the housing 17 of the test head 13 then delivers a signal measured in the immediate spectral range which, through an amplifier 29, indicates on an indicating instrument 20 the presence of ink on the test roller 14.

If the feed of dampening liquid is then increased, the test roller 14 again runs free of ink. The indicating instrument 30 then indicates the absence of an ink film on the surface of the test roller 14. The indicating device 28 clearly reproduces or reflects the thickness of the new dampening film.

In the normal operating position of the test roller 14, it measures only the thickness of the dampening film thereon equivalent to the dampening film on the second dampening applicator roller 11 and also indicates the shading in the case of insufficient dampening. Experiments have shown that the acceptance or take-up of ink on the test roller 14 occurs simultaneously with the shading or even earlier than on the offset plate.

This is readily understandable because the test roller 14 is in contact with the unused ink film of the first ink applicator roller 21 and with the somewhat used-up dampening film of the dampening applicator roller. The influence of the ink is greater.

If the test roller 14 is brought into engagement with the two applicator rollers in such a way that the outer casing surface of the test roller 14 comes into contact initially with the inking applicator roller 12 and only thereafter with the dampening applicator roller 11, the test head 13 being therefore, slightly displaced, then the contact with the second dampening applicator roller 11 is interrupted without breaking off contact with the inking applicator roller 12. In this setting, after a transitional phase wherein the test roller 14 accepts or picks up ink, the absolute thickness of the ink layer on the ink applicator roller 12, represented by the thickness of the accumulated ink layer on the test roller 14, can be indicated by means of the phototransistor 21, the amplifier 29 and the indicating instrument 13. With the hereinaforedescribed test apparatus, the printer is capable of assessing and regulating the supply of both ink and dampening liquid.

Figure 2:
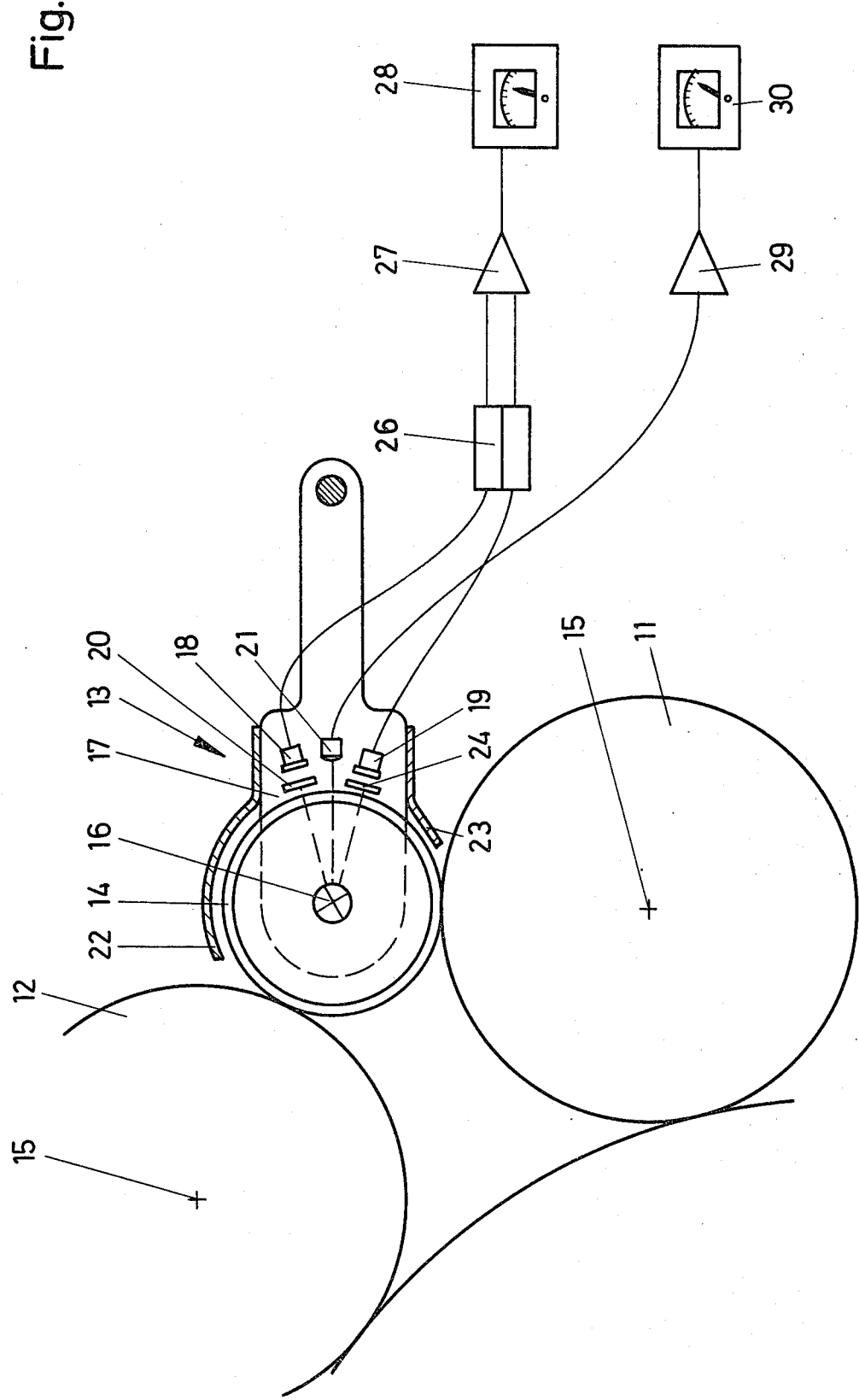
FIG. 2 is an enlarged fragmentary view of FIG. 1 showing the transmitted light test meter in greater detail and partly schematically.

The embodiment described hereinbefore with respect to FIGS. 1 and 2 is subject to many variations. For example, the infa-red radiation source and the infa-red detectors can be interchanged locally for the purpose of picking up the test signal. There is also the possibility of improving the efficiency of the radiation by providing a lens system. The test roller 14 preferably is formed of a material affording high transmission for infra-red rays and exhibiting only slight deviations in form. Quartz glass is best suited for the material of the test roller 14. An alternating-current amplifier may also possibly be provided for amplifying the test signal, although the rays must be chopped or vibrated in such a case.

Figure 3:
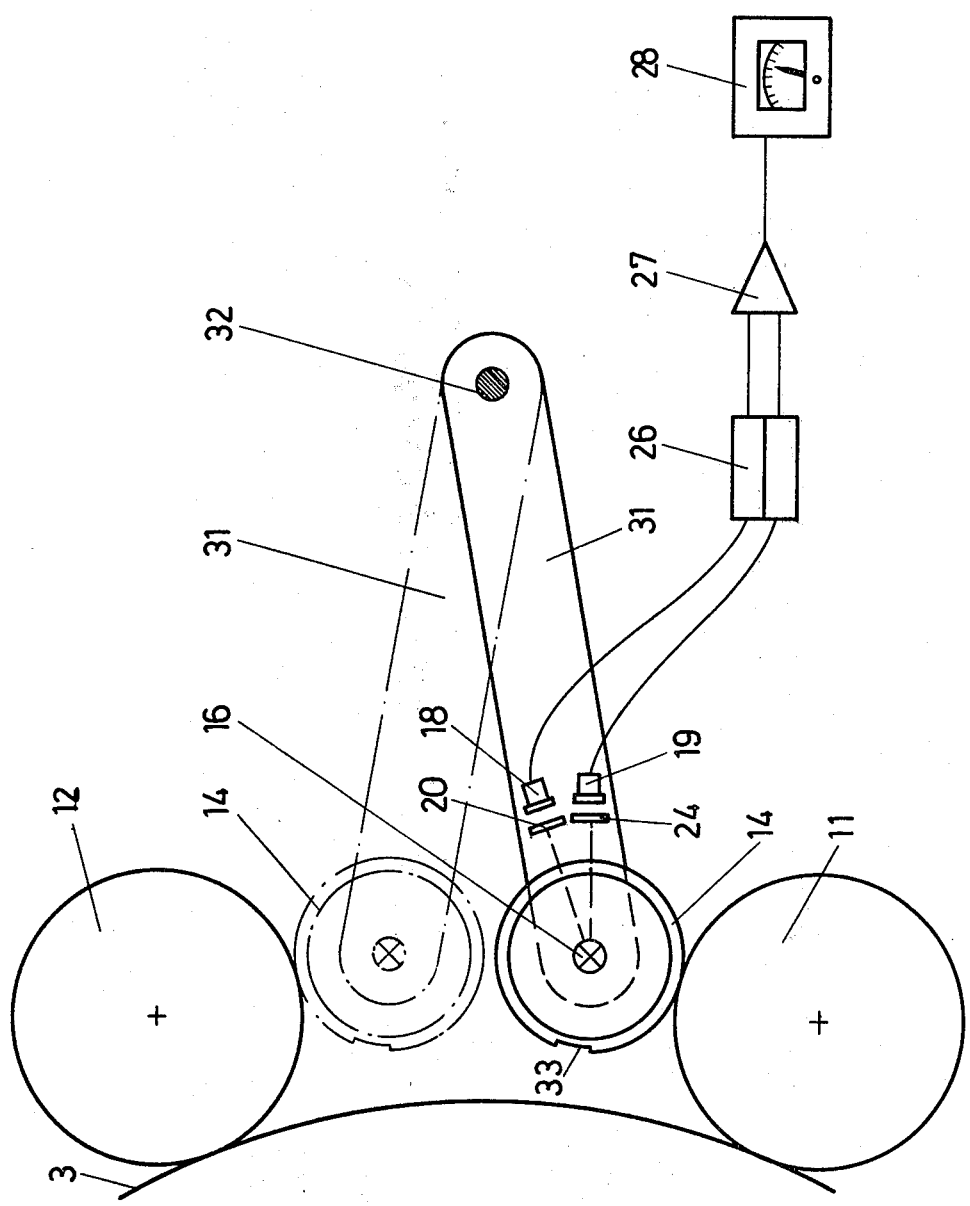
FIG. 3 is a view similar to that of FIG. 2 and showing another embodiment of the invention wherein a test roller is adjustable alternately to the last dampening and the first inking applicator roller.

FIG. 3 shows another embodiment of the invention wherein the transparent test roller 14 is mounted rotatably on a pivot lever 31 which is pivotable about a pivot axis 32 in such a way that the test roller 14 can be placed in contact selectively with the dampening applicator roller 11 or the ink applicator roller 12. The infra-red detectors 18 and 19 and the filters 20 and 24 disposed in front i.e., upstream, thereof from the radiation source 16 located within the test roller 14, are mounted on the pivot lever 31. The infra-red detectors 18 and 19 are connected through the, in turn, electrically connected impedance transducer 26 and the computing amplifier 27 to the indicating instrument 16, in the same manner as described hereinbefore for the embodiment of FIG. 2. The outer casing of the test roller 14 is formed with a channel 33 extending in axial direction and interrupting the outer casing surface of the test roller 14 which accepts or takes up the dampening-liquid and ink film. The channel 33 is covered by an opaque i.e. radiation-impermeable, layer.

The test roller 14 in the position thereof shown in solid lines in FIG. 3 is disposed in lower work position i.e. the test roller 14 is in contact with the second dampening applicator roller 11 and the outer casing surface thereof is therefore wetted with a film of dampening liquid corresponding to the steady or equilibrium state and having a predetermined thickness. If the test roller 14 is then pivoted into the upper work position thereof, as shown in FIG. 3, and brought into contact with the first ink applicator roller 12, the test roller 14 is no longer supplied with dampening liquid from the damping unit, and the residual film of dampening liquid thereon is picked up and transported away by the ink applicator roller 12. After a given time or number of rotations of the test roller 14, and with the simultaneous effect of evaporation, the dampening film on the test roller 14 dissipates to such an extent that the test roller 14 begins to be inked by the available ink. After a few further rotations, this inking has proceeded so far that a new steady or equilibrium state with constant ink-layer thickness has occurred.

It is then possible, by means of the channel 33, to measure the number of rotations of the test roller 14 from the time it has been switched over from the lower work position to the upper position thereof, as shown in FIG. 3, until the commencement of inking and, moreover, until the inking is terminated.

If a thick film of dampening liquid were present before the commencement of the operation, then the instant of commencement of the inking would occur later than for a thin film.

The number of rotations or revolutions of the test roller 14 which occur before commencement of inking is therefore a measure of the thickness of the originally existing dampening film.

As further explained hereinbefore with reference to a plotted curve, due to the short interruption of the actual test signal, a peak occurs due to the capacity of the channel, the channel 33 facilitates the counting of the number of revolutions or rotations of the test roller 14 until the inking begins and, furthermore until steady state or equilibrium of the wetting with ink.

The same applies as well to the reverse process i.e. for the change of test roller contact from the inking roller 12 to the dampening roller 11. Therefore, if the test roller 14 is pivoted back into the lower operating position thereof, as viewed in FIG. 3, the outer casing surface thereof saturated with ink being brought into contact with that of the dampening roller 11, then the test roller 14 initially rotates free of ink until a dampening film has built up again afterwards. Depending upon the existing ink layer thickness and the thickness of the dampening film supplied, the number of revolutions or rotations until the test roller 14 runs free of ink is a measure of the quantitative ratio of dampening liquid and ink. In this case, again, the test signal is interrupted briefly by the channel 33 at each revolution or rotation and replaced by a peak.

Figure 4:
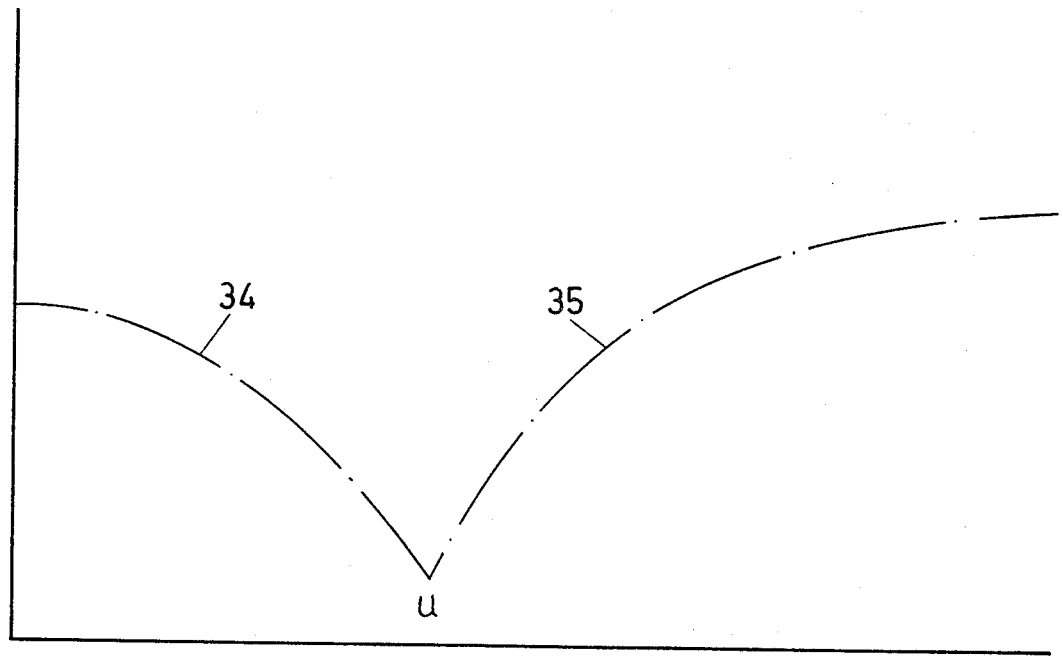
FIG. 4 is a plot diagram of test signal magnitude to dampening film thickness showing the general curve of the test signal.

In order to be able to provide a more detailed description of a possible mode of operation of the test apparatus according to FIG. 3, reference is made to the mode of operation of the test apparatus according to FIG. 2 for a better understanding thereof. If for any reason e.g. through evaporation of the film of dampening liquid due to vary high temperatures, the dampening-film thickness diminishes, the test signal indicating the dampening-film thickness, such as shown by the curve 34 in FIG. 4, for example, then also drops. If the thickness of the dampening film should then diminish too sharply i.e. down to a critical threshold the offset plate would then commence to tint or shade. Simultaneously, ink is fed to the test roller 14 over the dampening applicator roller 11 and the ink applicator roller 12. The test signal rises again, for example, in a course following the curve 35 of FIG. 4. The curve train 34, 35 shows a transition point.

Practical experiments have shown that the transition point coincides in time with the commencement of tinting or inking on the offset plate, or even occurs before the advent of tinting. The renewed rise of the test signal in accordance with the curve 35 might lead to a misinterpretation with regard to a renewed increase in the dampening film thickness, if the photo-transistor 21 (FIG. 2) did not simultaneously report the presence of ink i.e. tinting or shading through the amplifier 29 to the indicating instrument 20.

Figure 5:
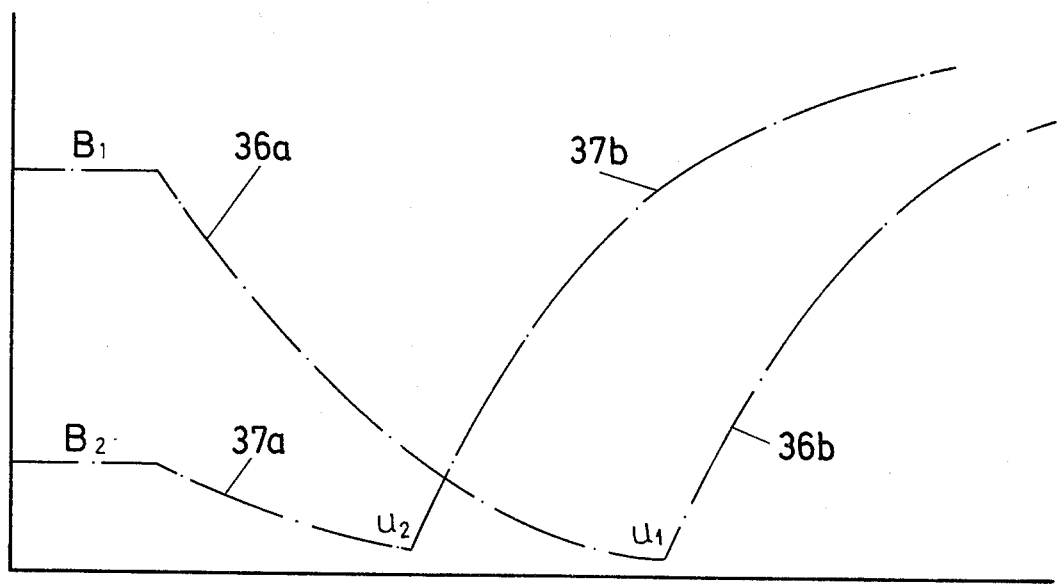
FIG. 5 is a plot diagram like that of FIG. 4 showing the test signals of different film thicknesses.

A similar test signal curve is developed when, in the embodiment according to FIG. 3, the test roller 14 changes over from the second dampening applicator roller 11 to the first ink applicator roller 12. A transition point U indicated by the indicating instrument 28 would then also traverse a course similar to that of FIG. 4 (see FIG. 5).

Immediately after contact by the test roller 14 with the inking roller 12, the test signal continues to exhibit the steady or equilibrium state $B_1$ of the dampening film which was possessed by the dampening film during contact of the test roller 14 with the dampening roller 11. The dissipation of the dampening film on the test roller then immediately commences, somewhat in conformity with a curve 36a shown in FIG. 5, until the transition point $U_1$ is reached. The thicker the dampening film is on the test roller 14, the more time elapses before the transition point U is reached, i.e. before inking-up of the test roller 14 commences and the signal gain rises in accordance with the curve 36b.

The test signal curve 36a, starting from the steady state $B_1$ to the transition point $U_1$, indicates a thicker film of liquid than the curve 37a, which starts from an assumed steady or equilibrium state $B_2$ of a thinner dampening film and reaches a transition point at $U_2$. It is believed to be readily apparent that not only the ordinates $B_1$ and $B_2$, but also the time which elapses before the transition point $U_1$, $U_2$ is reached, represent a measure for the dampening film thickness. The time period which elapses from the instant of contact of the test roller 14 with the inking roller 11 (switch-over point) until the transition point U is a measure of the dampening liquid film thickness which was present at the instant of the switch-over.

The just-mentioned time period is indicated in a suitable manner by means of the indicating instrument 28. For example, the number of rotations of the test roller 14 from the instant of switch-over i.e. from the change-over of the test roller 14 from contacting the dampening applicator roller 11 to contacting the ink applicator roller 12 or vice versa, until the transition point U is reached, may be indicated. It is also possible, however, to indicate the differential quotients of the test signal of the test apparatus in the alternate phases of the measurement from dampening liquid to ink and from ink to dampening liquid.

As indicated hereinbefore, the channel 33 formed in the outer casing surface of the test roller 14 briefly interrupts the test signal and provides a peak at each revolution.

Figure 6:
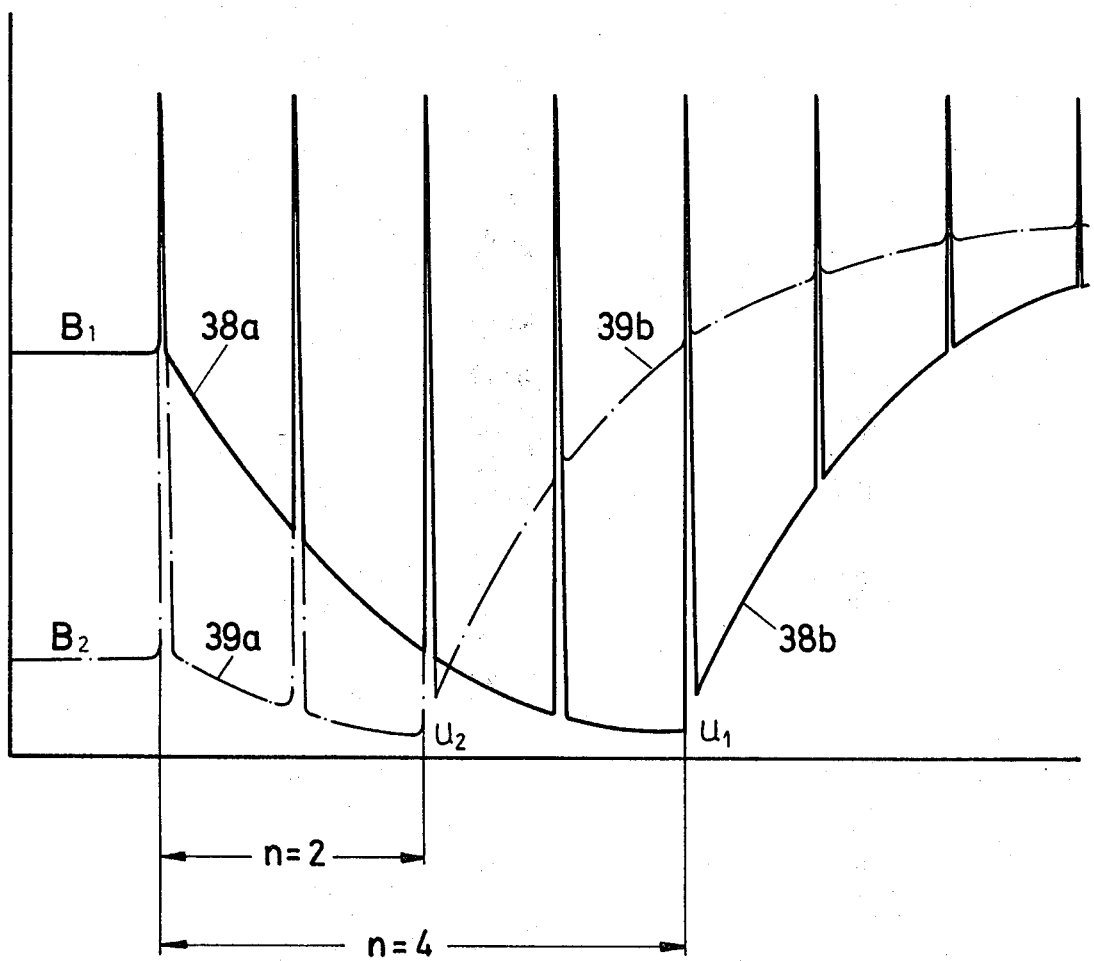
FIG. 6 is a plot diagram corresponding to that of FIG. 5 but showing a marking of the test roller revolutions in the test signal.

If the test signal is recorded by means of an indicating instrument 28 constructed as a recording instrument, then test signal curves according to FIG. 6 are formed.

In the test signal curve 38a, 38b, four peaks are recorded until just after the commencement of the inking, and in the test signal 39a, 39b, only two peaks corresponding to the number of revolutions or rotations of the test roller 14 until the transition point is reached. The number of the peaks before the transition point is reached is therefore a numerical measure of the initial thickness of the film of dampening liquid.

It is expressly noted, in this context, that the commencement of inking of the test roller 14 is not identical with the commencement of tinting or shading on the plate, whereby the disposition of the test roller 14 according to FIG. 3 differs considerably from that according to FIG. 2. During contact of the test roller 14 with the ink applicator roller 12, the supply of dampening liquid to the test roller 14 is interrupted, but not the supply to the offset plate, however, which continues undisturbed.

The dissipation of the layer of dampening liquid from the hydrophilic test roller 14 after contact with the inking roller 12 is accomplished by continuously splitting the water or dampening liquid film and is therefore scarcely affected by the thickness of the existing ink layer.

Figure 7:
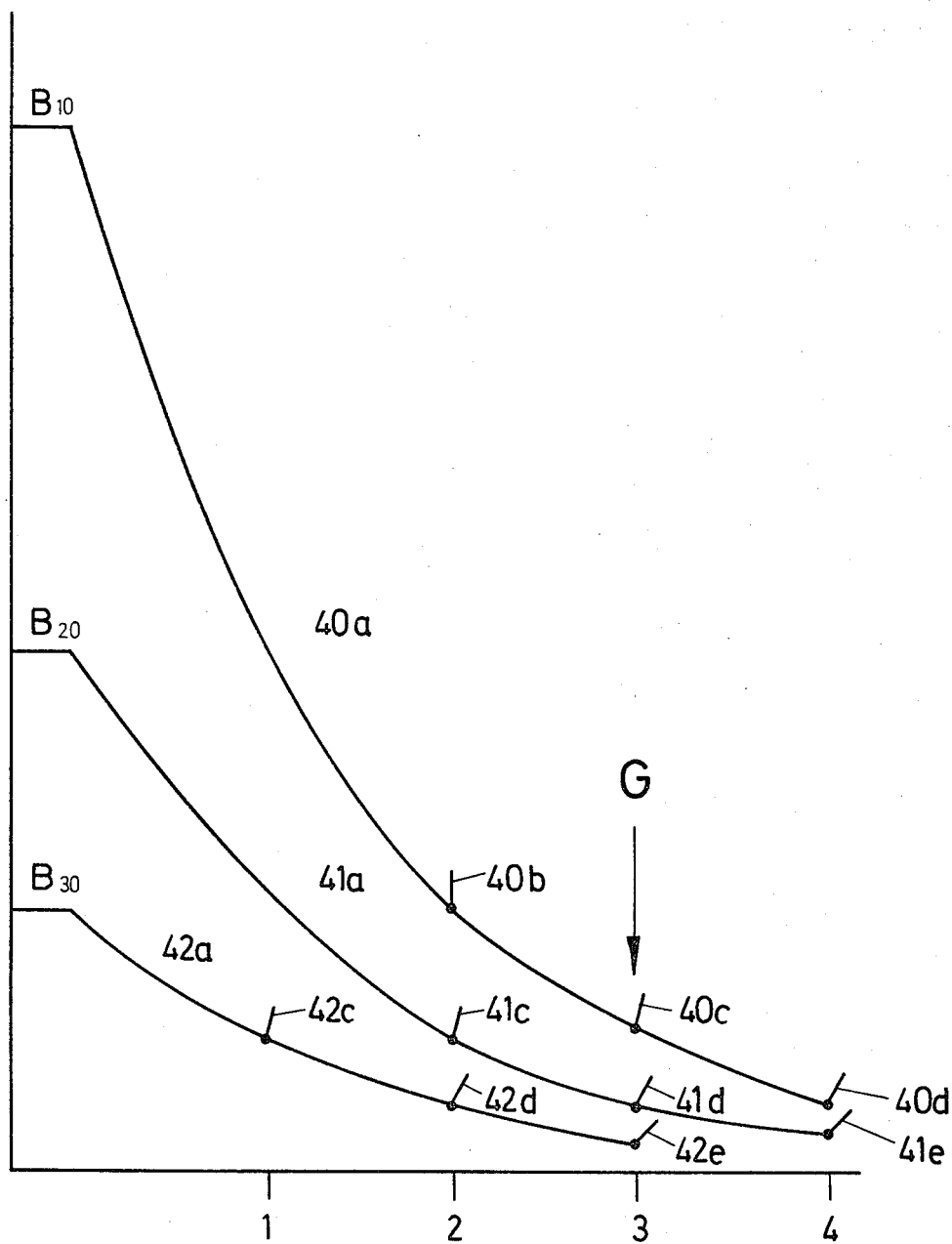
FIG. 7 is a plot diagram of film thickness test signals as a function of the ink/dampening-liquid ration.

When the test roller 14, inked to saturation $B_{10}$, $B_{20}$ or $B_{30}$, as shown in FIG. 7, (the thickness of the ink film on the test roller 14 being approximately equal to the thickness of the ink film on the inking roller 12) swings back into contact with the per se oleophilic dampening applicator roller 11, the ink film remaining on the test roller 14 is removed by the dampening applicator roller 11. The test roller 14 is completely wetted with dampening liquid by the constantly renewed dampening film on the dampening applicator roller 11. The mutual ratio of the respective layer thicknesses is a measure of how much time elapses before the test roller 14 becomes free of ink i.e. the transition point occurs, or a photo-transistor indicates the disappearance of the ink if such an instrument similar to that of FIG. 2 is incorporated into the apparatus according to FIG. 3.

FIG. 7 shows the test signal curves 40, 41 and 42 for three different ink layer thicknesses on the test roller 14 after the test roller pivots from the inking roller 12 to the dampening roller 11. The transition point will occur earlier or later depending upon the thickness of the dampening film present on the dampening roller 11. (The peaks are omitted in FIG. 7 in the interest of clarity). The transition points are denoted by the curve extensions with the indices b, c and d. The slope with which these curve extensions commence is a measure of the thickness of dampening film present on the dampening applicator roller 11 which, after the test roller 14 has run free of ink, is adjusted to the steady or equilibrium state. For a constant ink/dampening liquid ratio, the transition point occurs at the same time which, when once ascertained for the relevant ink, dampening liquid and type of plate, represents the optimum of the ink-/water supply. This instant is denoted by the arrow "G" (representing equilibrium) in FIG. 7.

If too little ink is supplied (e.g. curve 42), then the transition occurs earlier than is desired with the dampening liquid thicknesses, namely at the points 42c and 42d. Only a reduction of the dampening supply to a film thickness in accordance with the point 42e establishes the correct equilibrium. If this correction is not effected, the plate will carry too much water and will, for example, exhibit water marks in the impression.

If too much ink is supplied e.g. the transition point is at 40d, then either ink must be removed, which will shift the transition point to 41d, or water i.e. dampening liquid, must be supplied, in which case the transition point would be at 40c.

This means, in general terms:

The transition point occurs prematurely if the equilibrium is disturbed by a shift in direction towards too much dampening liquid, or the occurrence of the transition point will be delayed in the case of too much ink.

FIG. 7 indicates with what intensity the renewed build-up of the film of dampening liquid occurs. Like indices connote the same intensity and hence also equal dampening film thicknesses for the steady or equilibrium state. The measurement of the rise is furnished by the final dampening film thickness over the time constant. This also applies to the build-up of ink film on the test roller 14 when the latter is in contact with the ink applicator roller 12.

Figure 8:
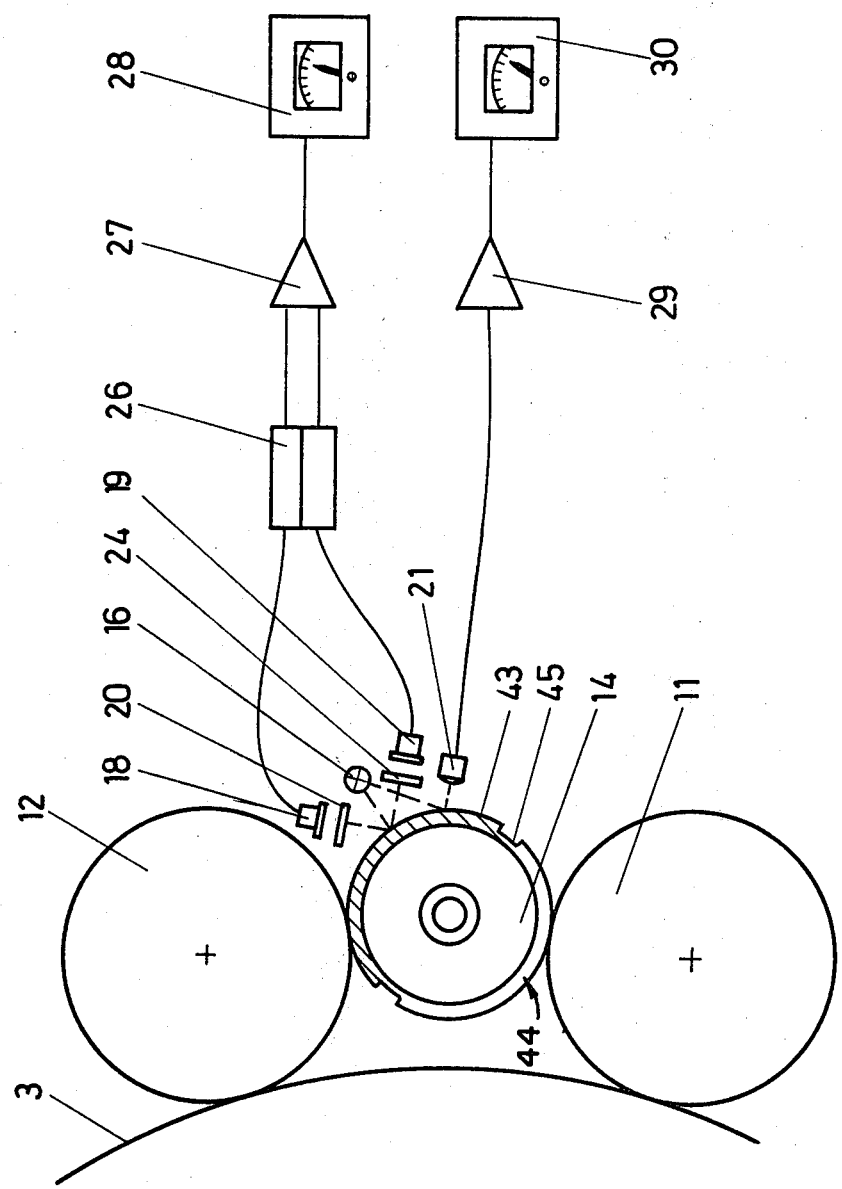
FIG. 8 is a view similar to those of FIGS. 2 and 3 of yet another embodiment of the invention showing the test roller in contact on both sides, with the outer casing surface thereof formed partly with a hydrophilic and partly with an oleophilic region.

FIG. 8 shows a third embodiment of the invention wherein the test roller 14 is provided with an oleophilic outer casing surface section 43 and with a hydrophilic outer casing surface section 44, respectively constituting half of the peripheral surface thereof. The two outer casing surface sections 43 and 44 are mutually separated by two channels 45. The oleophilic outer casing surface section 43 may be formed, for example, of copper, and the hydrophilic outer casing surface section 44 of chromium, for example. It is necessary therefore to use the incident light process for testing the film thickness on the outer casing surface of the test roller 14. The test head, shown only diagrammatically in FIG. 8, contains the radiation source 16, the infra-red detector 18 and 19 with the respective filters 20 and 24 associated therewith, and the photo-transistor 21, as in the embodiment of FIG. 2. Impedance transducers 26, computing amplifiers 27 and indicator instruments 28 are again provided, as in the embodiment of FIG. 2, for the purpose of indicating the test signals of the infra-red detectors 18 and 19. The photo-transistor 21 is electrically connected through the amplifier 29 to the indicating instrument 30 for the ink film thickness indication, in the same manner as in the embodiment of FIG. 2.

In the embodiment of FIG. 8, the test roller 14, in the operating position thereof, is permanently and simultaneously in contact with both the second dampening applicator roller 11 and the first inking applicator roller 12. The oleophilic outer casing or envelope surface section 43 of the test roller 14 accepts only ink from the inking applicator roller 12, while the hydrophilic envelope surface section 44 accepts only dampening liquid from the dampening applicator roller 11, although both test surface halves are in contact with both applicator rollers consecutively. The photo-transistor 21 is switched on as the oleophilic outer casing surface 43 travels past, and the infra-red detectors 18 and 19 are switched on when the hydrophilic envelope surface 44 travels past. The indicating instrument 28 thus indicates a dampening film thickness corresponding to that of the second dampening applicator roller 11, whereas the indicating instrument 30 indicates an ink film thickness corresponding to that of the inking applicator roller 12.

The printer controlling the supply of dampening liquid and ink thus has a test value which reproduces very satisfactorily the dampening liquid ink ratio actually present on the plate, because the test roller 14 is in contact, in the same manner as is the offset plate, with the rollers of the dampening and inking units. It is then a relatively simple matter for the printer to adjust the dampening/inking equilibrium at what he determines to be optimum. It is also possible to utilize the test signals of the infra-red detectors 18 and 19, as well as of the photo-transistor 21, for an automatic adjustment of the dampening/inking equilibrium.

There are claimed:

1. Device for testing dampening liquid and ink equilibrium in offset printing units having a plurality of dampening liquid applicator rollers defining a dampening film flow path and a plurality of ink applicator rollers defining an ink film flow path, comprising a solitary test roller disposable in at least one of the flow paths and having an outer casing surface partly of hydrophilic and partly of oleophilic construction, means for effecting contact between said solitary test roller and at least one roller of the respective pluralities of dampening liquid and ink applicator rollers so as to form a corresponding film thereon and means cooperating with said test roller for sensing and evaluating the thickness of the dampening liquid and the ink films, respectively, and thereby testing dampening liquid and ink equilibrium, said test roller being pivotally mounted and being contactable alternately with the one ink applicator roller and the one dampening liquid applicator roller, and said outer casing surface of said test roller being formed with a region extending in axial direction of said test roller and being non-wettable by the dampening liquid and the ink.

2. Device according to claim 1 wherein the offset printing unit has a plate cylinder rotatable in given direction, said pluralities of dampening liquid and ink applicator rollers being engageable with the plate cylinder, said test roller being contactable with the last of the dampening liquid applicator rollers and the first of the ink applicator rollers as viewed in rotary direction of the plate cylinder.

3. Device according to claim 1 wherein said non-wettable region is a channel formed in said outer casing surface.

4. Method of testing dampening liquid and ink equilibrium in offset printing units wherein a test roller is pivotally mounted and is contactable alternately with one ink applicator roller and one dampening liquid applicator roller, and the outer casing suface of the test roller is formed with a region non-wettable by the dampening liquid and the ink and extending in axial direction of the test roller, which comprises irradiating two infra-red detectors with radiation from a radiation source disposed in a glass test roller alternatingly in contact with an ink applicator roller and a dampening liquid applicator roller so that the radiation penetrates the glass test roller and a film formed therein before the radiation reaches the infra-red detectors, recording test signals from the infra-red detectors in the form of a plotted curve indicating selectively removal of the ink by the dampening liquid and removal of the dampening liquid by the ink on the outer casing surface of the test roller, the non-wettable region formed on the outer casing surface interrupting the plotted curve with each rotation of the test roller so that the number of interruptions before complete removal of the ink and the dampening liquid, respectively, is a measure of the thickness of the respective film thereof on the respective applicator roller.

5. Method according to claim 4 which comprises indicating the number of rotations of the test roller from the instant at which it changes over from being in contact with the one roller of the respective dampening liquid and inking applicator rollers to the other roller of the respective dampening liquid and inking applicator rollers to the instant at which a transition point occurs.

6. Method according to claim 4 which comprises indicating the differential quotient of the test signal issued in the respective alternating contact condition of the test roller and the dampening liquid and ink applicator rollers from dampening liquid to ink and from ink to dampening liquid.

* * * * *